UNITED STATES PATENT OFFICE.

JOHN M. WARREN, OF BOSTON, MASSACHUSETTS.

IMPROVED POLISH FOR GLASS.

Specification forming part of Letters Patent No. 50,406, dated October 10, 1865; antedated September 28, 1865.

*To all whom it may concern:*

Be it known that I, JOHN MERRILL WARREN, of Boston, in the county of Suffolk and State of Massachusetts, have invented a new and useful Improvement in Window-Polish; and I do hereby declare that the following is a full and exact description of the mode of compounding and using the same.

The compound herein described is used chiefly for giving a brilliant luster and smooth surface to mirrors, windows, glassware, and other articles. The substances of which this polish is made, the relative proportion of each, and the mode of applying the paste to the articles to be cleaned are herein fully set forth.

I first dissolve a quantity of carbonate of potash in water, making a saturated solution, its strength being such that if more potash is added it will be thrown down in a fine powder. Of this solution I take about two quarts and mix it with three quarts of whale-oil. I sometimes use neat's-foot oil or lard-oil instead of whale-oil, preference being given to those oils that do not dry quickly, but remain slightly moist, thus preventing the compound from becoming too hard for convenient use. The potash and oil being mixed as above stated, I then add about five pounds of French rottenstone in fine powder and twenty-five pounds of bolted whiting. The whole is then well stirred and brought to an even consistence, forming a thick paste, which is then packed in boxes for use.

The glass or other substance to be polished is covered with a thin coat of the composition or paste by putting a small quantity upon a damp cloth and rubbing it evenly over the surface of the glass. When dry, wipe the glass with a dry cloth. This leaves it thoroughly clean and produces a brilliant and uniform luster.

The quantity of each of the substances named above may be slightly varied; but I find that the best result is attained by making the compound in the proportions herein set forth.

What I claim, and desire to secure by Letters Patent, is—

The compound for polishing glass and other substances, as herein described.

JOHN M. WARREN. [L. S.]

In presence of—
JOHN M. BATCHELDER,
FRANK C. DODGE.